(12) United States Patent
Alvarez et al.

(10) Patent No.: US 10,856,556 B2
(45) Date of Patent: Dec. 8, 2020

(54) LOW UPTAKE OIL COMPOSITION

(71) Applicants: Carlos Andres Alvarez, Bogota (CO); Aron Ortiz, Morelia (MX)

(72) Inventors: Carlos Andres Alvarez, Bogota (CO); Aron Ortiz, Morelia (MX)

(73) Assignee: Team Food Colombia S.A., Bogota (CO)

( * ) Notice: Subject to any disclaimer, the term of this patent is extended or adjusted under 35 U.S.C. 154(b) by 877 days.

(21) Appl. No.: 14/415,504

(22) PCT Filed: Oct. 31, 2012

(86) PCT No.: PCT/IB2012/002198
§ 371 (c)(1),
(2) Date: Jan. 16, 2015

(87) PCT Pub. No.: WO2014/020373
PCT Pub. Date: Feb. 6, 2014

(65) Prior Publication Data
US 2015/0164100 A1 Jun. 18, 2015

Related U.S. Application Data

(60) Provisional application No. 61/674,077, filed on Jul. 20, 2012.

(51) Int. Cl.
| A23D 9/013 | (2006.01) |
| A23D 9/00 | (2006.01) |
| C11B 5/00 | (2006.01) |
| A23L 5/10 | (2016.01) |
| A23L 29/00 | (2016.01) |

(52) U.S. Cl.
CPC ............. *A23D 9/013* (2013.01); *A23D 9/00* (2013.01); *A23L 5/11* (2016.08); *A23L 29/04* (2016.08); *C11B 5/00* (2013.01)

(58) Field of Classification Search
CPC .................................. A23L 29/04; C11B 5/00
See application file for complete search history.

(56) References Cited

U.S. PATENT DOCUMENTS

| 4,188,410 A * | 2/1980 | Rispoli ................. A23D 9/013 426/296 |
| 4,680,184 A * | 7/1987 | Seiden ..................... A21D 2/16 426/103 |
| 6,103,308 A * | 8/2000 | Floyd .................... D21H 19/46 162/136 |
| 6,277,433 B1 * | 8/2001 | Lantz .................... A21D 2/165 426/601 |
| 6,436,459 B2 * | 8/2002 | Martinez-Serna Villagran .......... A23D 9/013 426/438 |
| 6,743,930 B2 * | 6/2004 | Li ......................... A23D 9/007 554/11 |
| 2002/0031595 A1 * | 3/2002 | Wester .................. A23D 9/007 426/601 |
| 2005/0008749 A1 | 1/2005 | Tak Lin et al. |
| 2008/0206435 A1 * | 8/2008 | van den Enden ........ A23D 9/00 426/606 |
| 2010/0291272 A1 | 11/2010 | Steffens et al. |
| 2012/0276267 A1 * | 11/2012 | Daza Leguizamon ..................... A23D 9/007 426/546 |

FOREIGN PATENT DOCUMENTS

| JP | 2005192563 A | 7/2005 |
| WO | 9505090 A1 | 2/1995 |

OTHER PUBLICATIONS

Stanley Okezie "Production of Cocoa Butter Substitutes/Equivalents From Palm Oil, Shea Butter, and Dika Fat Using Aspergillus niger lipase" 2001 University of Nigeria Research Publications (Year: 2001).*
Bigorra et al. DE 19905104 Derwent Abstract 3 pages (Year: 2000).*

* cited by examiner

*Primary Examiner* — Felicia C Turner
(74) *Attorney, Agent, or Firm* — Greenberg Traurig, LLP

(57) ABSTRACT

The Resent invention includes a oil composition that contains a fat base and an uptake reducer. The oil composition is usable in both skillet frying and deep frying processes, and reduces the uptake of oil by fried food products without affecting the its sensory profile.

10 Claims, No Drawings

LOW UPTAKE OIL COMPOSITION

RELATED APPLICATION

This application is a national phase filing under 35 U.S.C. 371 of International Application No. PCT/IB2012/002198, filed on Oct. 31, 2012, which claims the benefits of U.S. Provisional Application No. 61/674,077 filed Jul. 20, 2012, the entirety of these applications is hereby incorporated herein by reference for the teachings therein.

COPYRIGHT NOTIFICATION

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND OF THE INVENTION

1. Field of the Invention

The present invention relates to an oil composition, and more particularly, an oil composition to reduce an absorption of the oil by a food product during a frying process.

2. Description of the Related Art

Food products, such as French fries, corn snacks, or chips, are commonly prepared by frying in oil. That is, by immersing the food product in heated oil or fat at a temperature higher than the boiling point of water. During the frying process, some of the oil is absorbed by the food product, increasing its total fat content. With the rising popularity of healthy food options, there is an emerging demand for food products with a lower fat content, and thus, there is a demand for oil compositions that reduce the oil uptake by fried food products.

SUMMARY OF THE INVENTION

Additional goals and advantages of the present invention will become more evident in the description of the figures, the detailed description of the invention, and the claims.

The foregoing and/or other aspects and utilities of the present invention may be achieved by providing an oil composition, including essentially at least 90% of an oil base, based on a total weight of the oil composition, including essentially at least one of a vegetable fat, a vegetable oil, vegetable oil blends, and mixtures thereof; and no more than 10% of an uptake reducer, based on the total weight of the oil composition, including essentially at least one of monoglycerides, diglycerides, triglycerides, and mixtures thereof, wherein, when a first test food product is fried in an oil composition in accordance with a First Frying Test Method, a fat content of the first test food product is at least 2% less than when the first test food product is fried in accordance with the First Frying Test Method using the oil base alone.

In another embodiment, the oil composition is cholesterol free, and wherein, based on a total amount of fatty acids in the oil composition: the saturated fatty acid content is between 10% and 99%, and, the trans-fatty acid content is no more than 2%.

In another embodiment, the uptake reducer has between 0.1% and 10% diglycerides, based on the total weight of the uptake reducer.

In another embodiment, the oil composition further includes one or more additional components, wherein the additional components are at least one of an antioxidant, an antifoamer, and a common frying oil additive.

In another embodiment, the oil composition includes essentially at least 94% of the oil base and no more than 6% of the uptake reducer, based on the total weight of the oil composition, and the uptake reducer has: between 10% and 99% saturated fatty acid content, based on a total amount of fatty acids in the uptake reducer, and 5% and 95% monoglycerides, 1% and 10% diglycerides, 5% and 95% triglycerides, and no more than 1% free glycerol, based on the total weight of the uptake reducer.

In another embodiment, the fat content of the first test food product fried in the oil composition in accordance with the First Frying Test Method is between 2% and 16% less than when the first test food product is fried in accordance with the First Frying Test Method using the oil base alone.

In another embodiment, the oil composition includes essentially at least 94% of the oil base and no more than 6% of the uptake reducer, based on the total weight of the oil composition, and the uptake reducer has: 75% saturated fatty acid content, based on a total amount of fatty acids in the uptake reducer, and 45% monoglycerides, 7% diglycerides, 48% triglycerides, and no more than 1% free glycerol, based on the total weight of the uptake reducer, and wherein the uptake reducer originates from a vegetable oil and has: an acid value (mg KOH/g) of no more than 2, an iodine value (g 12/100 g) of no more than 25, and a fusion point of 56° C.

In another embodiment, the oil composition does not separate into a solid and liquid phase when stored at 10° C. above a melting point of the oil composition after 10 days.

In another embodiment, the oil composition has a smoke point between 180° C. and 230° C.

In another embodiment, the oil composition includes essentially at least 95% of the oil base and no more than 5% of the uptake reducer, based on the total weight of the oil composition, and the uptake reducer has: at least 90% saturated fatty acid content, based on a total amount of fatty acids in the uptake reducer, and no more than 1% monoglycerides, between 90% and 99% triglycerides, and no more than 1% free glycerol, based on the total weight of the uptake reducer.

In another embodiment, the fat content of the first test food product fried in the oil composition in accordance with the First Frying Test Method is between 2% and 14% less than when the first test food product is fried in accordance with the First Frying Test Method using the oil base alone.

In another embodiment, the uptake reducer has no more than 0.1% monoglycerides, 7.2% diglycerides, 92.7% triglycerides, and no more than 1% free glycerol, based on the total weight of the uptake reducer, and wherein the uptake reducer originates from a vegetable oil and has: an acid value (mg KOH/g) of 0.05, an iodine value (g 12/100 g) of no more than 5, and a fusion point of between 56° C. and 60° C.

In another embodiment, the oil composition does not separate into a solid and liquid phase when stored at 10° C. above a melting point of the oil composition after 10 days.

In another embodiment, the oil composition includes at least one of a vegetable frying fat, a vegetable shortening, and a saturated vegetable fat.

In another embodiment, the oil composition includes essentially at least 95% of the oil base and no more than 5% of the uptake reducer, based on the total weight of the oil composition, and the uptake reducer has between 90% and 99% monoglycerides, no more than 1% triglycerides, and no more than 1% free glycerol, based on the total weight of the uptake reducer.

In another embodiment, the fat content of the first test food product fried in the oil composition in accordance with the First Frying Test Method is between 2% and 11% less than when the first test food product is fried in accordance with the First Frying Test Method using the oil base alone.

In another embodiment, the uptake reducer has 93% monoglycerides, 5% diglycerides, no more than 0.1% triglycerides, and no more than 1% free glycerol, based on the total weight of the uptake reducer, and wherein the uptake reducer originates from palm oil and has: an acid value (mg KOH/g) of no more than 3, an iodine value (g 12/100 g) of 40, and a fusion point of 55° C.

In another embodiment, the oil composition does not separate into a solid and liquid phase when stored at 10° C. above a melting point of the oil composition after 10 days.

In another embodiment, the oil composition has a smoke point between 180° C. and 230° C.

In another embodiment, the oil base includes a monounsaturated vegetable oil.

In another embodiment, the base includes a palm olein.

In another embodiment, the oil base includes a mixture of one or more vegetable oils and monounsaturated vegetable oils.

In another embodiment, the oil base includes at least one of high oleic sunflower oil, canola oil, palm olein, soy oil, rapeseed oil, cotton oil sunflower oil, and a mixture thereof.

In another embodiment, the oil base is a vegetable oil blend including at least one of palm oil, canola oil, soybean oil, and their fractions, and mixtures thereof.

The foregoing and/or other aspects and utilities of the present invention may be achieved by providing an oil composition, including essentially at least 95% of an oil base, based on a total weight of the oil composition, including essentially at least one of a vegetable fat, a vegetable oil, vegetable oil blends, and mixtures thereof; and no more than 5% of an uptake reducer, based on the total weight of the oil composition, wherein the uptake reducer including essentially: no more than 1% monoglycerides, between 1% and 10% diglycerides, between 90% and 99%% triglycerides, and no more than 1% free glycerol, based on the total weight of the uptake reducer, and at least 90% saturated fatty acid content, based on a total amount of fatty acids in the uptake reducer, wherein the uptake reducer originates from a vegetable oil and has: an acid value (mg KOH/g) between 0.05 and 3, an iodine value (g 12/100 g) between 0.1 and 80, and a fusion point of between 48° C. and 68° C., wherein the oil composition has less than 30 ppm cholesterol content, and wherein, based on a total amount of fatty acids in the oil composition: the saturated fatty acid content is between 10% and 99%, and the trans-fatty acid content is no more than 2%, and wherein, when a second test food product is fried in an oil composition in accordance with the Second Frying Test Method, a fat content of a second test food product is between 2% and 14% less than when the second test food product is fried in accordance with the Second Frying Test Method using the oil base alone.

The foregoing and/or other aspects and utilities of the present invention may be achieved by providing an oil composition, including essentially at least 95% of an oil base, based on a total weight of the oil composition, including essentially at least one of a vegetable fat, a vegetable oil, vegetable oil blends, and mixtures thereof; and no more than 5% of an uptake reducer, based on the total weight of the oil composition, wherein the uptake reducer including essentially: 0.1% and 99% monoglycerides, 0.1% and 10% diglycerides, 0.1% and 99% triglycerides, and no more than 1% free glycerol, based on the total weight of the uptake reducer, wherein the uptake reducer originates from a vegetable oil and has: an acid value (mg KOH/g) between 0.05 and 3, an iodine value (g 12/100 g) between 0.1 and 80, and a fusion point of between 48° C. and 68° C., wherein the oil composition is cholesterol free, and wherein, based on a total amount of fatty acids in the oil composition: the saturated fatty acid content is between 10% and 99%, and the trans-fatty acid content is no more than 2%, and wherein, when a third test food product is fried in an oil composition in accordance with the Third Frying Test Method, a fat content of a second test food product is between 2% and 11% less than when the third test food product is fried in accordance with the Third Frying Test Method using the oil base alone.

The foregoing and/or other aspects and utilities of the present invention may be achieved by providing a method of reducing the oil uptake of a fried food product, including: frying the food product in an oil composition including essentially at least 90% of an oil base and no more than 10% of an uptake reducer, based on a total weight of the oil composition, wherein a cholesterol content of the oil composition is less than 30 ppm, wherein a saturated fatty acid content of the oil composition is between 10% and 99% and a trans-fatty acid content of the oil composition is no more than 2%, based on a total amount of fatty acids in the oil composition, wherein the uptake reducer including essentially between 0.1% and 10% diglycerides, based on the total weight of the uptake reducer, and wherein, when a first test food product is fried in an oil composition in accordance with a First Frying Test Method, a fat content of the first test food product is at least 2% less than when the first test food product is fried in accordance with the First Frying Test Method using the oil base alone.

The foregoing and/or other aspects and utilities of the present invention may be achieved by providing a method of reducing the oil uptake of a fried food product, including: frying the food product in an oil composition including essentially at least 94% of an oil base and no more than 6% of an uptake reducer, based on a total weight of the oil composition, wherein a cholesterol content of the oil composition is less than 30 ppm, wherein a saturated fatty acid content of the oil composition is between 10% and 99% and a trans-fatty acid content of the oil composition is no more than 2%, based on a total amount of fatty acids in the oil composition, wherein the uptake reducer including essentially: 0.1% and 99% monoglycerides, 0.1% and 10% diglycerides, 0.1% and 99%% triglycerides, and no more than 1% free glycerol, based on the total weight of the uptake reducer, and 75% saturated fatty acid content, based on a total amount of fatty acids in the uptake reducer, and wherein, when a first test food product is fried in an oil composition in accordance with a First Frying Test Method, a fat content of the first test food product is between 2% and 16% less than when the first test food product is fried in accordance with the First Frying Test Method using the oil base alone.

DETAILED DESCRIPTION OF THE EMBODIMENTS

Reference will now be made in detail to the various embodiments of the present invention. The embodiments are described below to provide a more complete understanding of the components, processes and apparatuses of the present invention. Any examples given are intended to be illustrative, and not restrictive. Throughout the specification and claims, the following terms take the meanings explicitly associated herein, unless the context clearly dictates otherwise. The phrases "in one embodiment" and "in an embodiment" as used herein do not necessarily refer to the same embodiment(s), though they may. Furthermore, the phrases "in another embodiment" and "in some other embodiments" as used herein do not necessarily refer to a different embodiment, although they may. As described below, various embodiments of the present invention may be readily combined, without departing from the scope or spirit of the present invention.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In one embodiment of the present invention, an oil composition used in frying applications reduces the fat content or oil absorption in a fried food product, such as, but not limited to, French-fried potatoes and potato chips, chunky chips, cassava, doughnuts, extruded or laminated corn snacks, fried chicken, pre-fried potatoes, peanuts, etc. For example, food products fried in oil compositions according to embodiments of the present invention had a lower fat content after being fried than the same food products fried in conventional frying oils.

In another embodiment, food substrates subjected to frying processes, such as shallow frying or deep frying, using an oil composition according to the present invention offer excellent sensory attributes, such as texture, appearance, and crispness.

In embodiments of the present invention, the oil composition includes an oil base and an uptake reducer.

In one embodiment, the fat content of a food product fried in the oil composition was at least 2% lower than the fat content of the same food product fried in the oil base alone. In another embodiment, the fat content of the food product was at least 4% lower than the fat content of the same food product fried in the oil base alone. In another embodiment, the fat content of the food product was at least 6% lower than the fat content of the same food product fried in the oil base alone. In another embodiment, the fat content of the food product was at least 8% lower than the fat content of the same food product fried in the oil base alone. In another embodiment, the fat content of the food product was at least 10% lower than the fat content of the same food product fried in the oil base alone. In another embodiment, the fat content of the food product was at least 12% lower than the fat content of the same food product fried in the oil base alone. In another embodiment, the fat content of the food product was at least 14% lower than the fat content of the same food product fried in the oil base alone. In another embodiment, the fat content of the food product was at least 16% lower than the fat content of the same food product fried in the oil base alone. In another embodiment, the fat content of the food product was at least 18% lower than the fat content of the same food product fried in the oil base alone.

In one embodiment, based on the total weight of the oil composition, the oil composition includes at least 90% of the oil base. For example, in one embodiment, the oil composition includes between 91% and 98.5% oil base. In another example, the oil composition includes between 92% and 98% oil base. In another example, the oil composition includes between 95% and 97% oil base. In another example, the oil composition includes at least 95% oil base.

In one embodiment of the invention, the oil base may be any vegetable fat useful for frying food products. For example, in one embodiment the oil base is a vegetable oil. In another example, the oil base is a monounsaturated vegetable oil. In another example, the oil base is a vegetable frying fat, a vegetable shortening, or a saturated vegetable fat. In another example, the oil base is a mixture of one or more vegetable oils and/or monounsaturated vegetable oils. For example, the oil base may be one or more of a monounsaturated vegetable oil, such as high oleic sunflower oil, canola oil, palm olein, soy oil, sunflower oil, rapeseed oil, cotton oil, or a mixture thereof. In another example, the oil base may be a vegetable oil blend including palm oil, canola oil, soybean oil, or their fractions.

In one embodiment of the present invention, the oil composition qualifies as cholesterol free under the U.S. Food and Drug Administration's ("FDA") Definitions of Nutrient Content Claims. In another embodiment, the oil composition has no more than 0.1% cholesterol, based on the total weight of the oil composition. In another embodiment, the oil composition has no more than 30 ppm cholesterol content.

In one embodiment of the present invention, the oil composition qualifies as trans-fat free under the U.S. Food and Drug Administration's ("FDA") Definitions of Nutrient Content Claims. In one example, the oil composition has no more than 0.5 grams trans-fats per 100 grams of oil composition. In another example, a trans-fatty acid content of the oil composition is no more than 2% based on a total amount of fatty acids in the oil composition.

In one embodiment of the present invention, based on the total weight of the oil composition, the oil composition includes between 1% and 10% of the uptake reducer. For example, in one embodiment the oil composition includes between 1.5% and 9% uptake reducer. In another embodiment, the oil composition includes between 2% and 8% of the uptake reducer. In another embodiment, the oil composition includes between 3% and 5% uptake reducer. In another embodiment, the oil composition includes no more than 5% uptake reducer.

In one embodiment of the present invention, the oil composition includes essentially the base oil and the uptake reducer. In another embodiment, the oil composition includes essentially the base oil, the uptake reducer, and other components that do not materially affect the reduction of oil uptake for food products fried in the oil composition. In another embodiment, the components of the oil composition are limited to the base oil, the uptake reducer, and additional components that do not materially affect the basic and novel characteristics of the oil composition.

In one embodiment of the present invention, the uptake reducer includes monoglycerides. In another embodiment, the uptake reducer includes diglycerides. In another embodiment, the uptake reducer includes monoglycerides, diglycerides, triglycerides, or a mixture thereof. In another embodiment the uptake reducer includes between 0.1% and 99% monoglycerides and between 0.1% and 10% diglycerides, based on a total weight of the uptake reducer. In another embodiment, the uptake reducer includes no more than 1% free glycerol, based on the total weight of the uptake reducer. In another embodiment, the uptake reducer includes between 0.1% and 90% monoglycerides and between 0.1% and 10% diglycerides, based on the total weight of the uptake reducer. In another embodiment, the uptake reducer includes between 0.1% and 90% monoglycerides, between 0.1% and 10% diglycerides, and between 0.1% and 99% triglycerides. In another embodiment, the uptake reducer includes between 0.1% and 90% monoglycerides, between 0.1% and 10% diglycerides, and between 0.1% and 90% triglycerides. For example, in one embodiment, the uptake reducer includes between 5% and 95% monoglycerides, between 1% and 10% diglycerides, and between 5% and 95% triglycerides. In another embodiment, the uptake reducer includes between 5% and 50% monoglycerides, between 1% and 10% diglycerides, and between 5% and 50% triglycerides. In another embodiment, the uptake reducer includes 45% monoglycerides, 7% diglycerides, 48% triglycerides, and no more than 1% free glycerol. In another example, in one embodiment, the uptake reducer includes no more than 1% monoglycerides, between 1% and 10% diglycerides, and between 90% and 99% triglycerides. In another embodiment, the uptake reducer includes no more than 0.1% monoglycerides, 7.2% diglycerides, 92.7% triglycerides, and no more than 1% free glycerol. In another example, in one embodiment, the uptake reducer includes between 90% and 99% monoglycerides, between 1% and 10% diglycerides, and no more than 1% triglycerides. In another embodiment, the uptake reducer includes 93% monoglycerides, 5% diglycerides, no more than 0.1% triglycerides, and no more than 1% free glycerol.

In one embodiment of the invention, the uptake reducer does not contain diglycerides and/or free glycerol.

In another embodiment of the invention, the uptake reducer may include fully hydrogenated vegetable oils with at least 90% saturated fatty acid content, oil fractions with at least 50% saturated fatty acid content, partially hydrogenated vegetable oils with at least a 30% saturated fatty acid content, or mixtures thereof.

In another embodiment of the invention, the uptake reducer may include emulsifying compounds. For example, the uptake reducer may include 90% pure Alpha-monoglycerides with between 5% and 99% saturated fatty acid content, at least 50% pure diglycerides with between 5% and 99% saturated fatty acid content, fully hydrogenated monoglycerides, fully hydrogenated diglycerides, and a mixture of fully hydrogenated monoglycerides and fully hydrogenated diglycerides.

In one embodiment of the present invention, the uptake reducer has an acid value (mg KOH/g) between 0.05 and 3, an iodine value (g 12/100 g) between 0.1 and 80, and a fusion point of between 48° C. and 68° C. For example, in one embodiment, the uptake reducer has an acid value (mg KOH/g) of no more than 2, an iodine value (g 12/100 g) of no more than 25, and a fusion point of 56° C. In another example, the uptake reducer has an acid value (mg KOH/g) of 0.05, an iodine value (g 12/100 g) of no more than 5, and a fusion point of between 56° C. and 60° C. In another example, the uptake reducer has an acid value (mg KOH/g) of no more than 3, an iodine value (g 12/100 g) of 40, and a fusion point of 55° C.

In one embodiment of the present invention, the uptake reducer is in solution with the oil base. In another embodiment, the oil composition does not separate into a solid and liquid phase when stored above a melting point of the oil composition for at least 5 days. In another embodiment, the oil composition does not separate into a solid and liquid phase when stored above a melting point of the oil composition for at least 10 days. In another embodiment, the oil composition does not separate into a solid and liquid phase when stored above a melting point of the oil composition for at least 15 days. For example, in one embodiment, the oil composition does not separate into a solid and liquid phase when stored at 10° C. above the melting point of the oil composition after 10 days.

In one embodiment of the present invention, the total content of saturated fatty acids in the oil composition is no more than 50%, based on a total amount of fatty acids in the oil composition. In another embodiment, the oil composition includes between 5% and 99% saturated fatty acid content, based on a total amount of fatty acids in the oil composition. In another embodiment, the oil composition has a saturated fatty acid content between 10% and 90%. In another embodiment, the oil composition has a saturated fatty acid content between 25% and 75%.

In addition, in other embodiments of the invention, the oil composition includes additional components, such as, but not limited to, antioxidants, antifoaming agents, or other additives commonly used with frying oils. For example, in one embodiment; the oil composition includes between 20 and 400 ppm of the additional component(s). In another embodiment, the oil composition includes between 50 and 200 ppm or between 100 and 120 ppm of the additional component(s).

In one embodiment of the present invention, the additional components include one or more antioxidants, such as Tocopherol, TBHQ, BHT, BHA, Propyl gallate, or combinations thereof. For example, in one embodiment, the additional component is TBHQ.

In one embodiment of the present invention, a smoke point of the oil composition is between 180° C. and 230° C. For example, in one embodiment, the oil composition has a smoke point of 180° C. or higher.

Illustrative examples of oil compositions according to the present invention were prepared as described below. These examples should in no way be considered limiting, they simply serve to illustrative the principles of the invention described herein and defined in the appended claims and their equivalents.

Example 1A

An oil composition was prepared as follows: 95% by weight of a vegetable oil blend (including palm oil, canola oil, soybean oil, or their fractions) was mixed with 5% by weight of TABACO1, an uptake reducer, based on the total weight of the oil composition. The vegetable oil blend and the TABACO1 were mixed at a temperature of 68° C., using a Stephan 132M-4/2-180 colloid mill with two speeds (1698 rpm and 3456 rpm) for 10 minutes with recirculation. Additionally, 120 ppm of TBHQ (tert-Butylhydroquinone) was added as an antioxidant agent and 7 ppm of DMPS (dimethyl polisiloxane) was added as an antifoaming agent.

Tables 1A, 2A, 3A, 4A, and 5A illustrate the physicochemical parameters and lipid composition of the oil composition of Example 1A and its components,

TABLE 1A

OIL COMPOSITION OF EXAMPLE 1A

| | |
|---|---|
| Acidity (% Oleic) | 0.04 |
| Peroxides (mEq $O_2$/Kg, sample) | 0.05 |
| Monoglycerides (%) | 1.87% |
| Diglycerides (%) | 6.4% |
| Triglycerides (%) | 31.7% |
| Composition of fatty acids | % |
| C16:0 | 25.16 |
| C18:0 | 4.9 |
| C18:1 | 40.75 |
| C18:2 | 21.14 |

TABLE 2A

TABACO1

| | |
|---|---|
| Total monoglycerides (%) | 45 |
| Total diglycerides (%) | 7 |
| Total triglycerides (%) | 48 |
| Free glycerol (%) | Max. 1 |
| Acid value (mg KOH/g) | Max. 2 |
| Iodine value (g 12/100 g) | Max. 25 |
| Saturated fatty acid content (%) | 75 |
| Fusion point (° C.) | 56 |
| Physical form | Plastic |
| Appearance | White |
| Origin | Vegetable oil |

TABLE 3A

OIL BASE (VEGETABLE OIL BLEND) COMPOSITION

| | |
|---|---|
| Acidity (% Palmitic) | 0.04 |
| Peroxides (mEq $O_2$/Kg. sample) | 0.1 |
| Monoglycerides (%) | <0.1 |
| Diglycerides (%) | 6.5 |
| Triglycerides (%) | 93.4 |
| Composition of fatty acids | % |
| C16:0 | 24.58 |
| C18:0 | 4.09 |
| C18:1 | 41.46 |
| C18:2 | 21.64 |

TABLE 4A

TBHQ (tert-Butylhydroquinone)

| | |
|---|---|
| Purity (%) | Min 99 |
| Fusion point (° C.) | 127 |
| Boiling point (° C.) | 295 |
| Flash point (° C.) | 171 |
| Content of hydroquinone (%) | Max. 0.1 |
| Appearance | White powder |

TABLE 5A

DMPS (Dimethyl Polisiloxane)

| | |
|---|---|
| Specific Gravity at 25° C. (77° F.) | 0.960 |
| Melt Point, ° C. (° F. | −41 (−42) |
| Appearance | Crystal clear liquid from suspended matter and sediment |
| Surface Tension at 25° C. (77° F.), dynes/cm | 20.8 |
| Color, APHA | 5 |
| Viscosity Temperature Coefficient | 0.59 |

In embodiments of the present invention, various American Oil Chemists' Society (AOCS) or Association of Analytical Communities (AOAC) methods may be used to evaluate the physicochemical parameters and lipid composition of the various Examples. For example:

Quantitative determination of fatty acids: AOCS ce 1-e91
Quantitative determination of triglycerides, diglycerides and monoglycerides by high-temperature gas chromatography: AOCS ce 5-86
Extraction of fat for fat content determination: AOAC 945.16
Determination of fusion point: AOCS CC1-25
Determination of TBHQ: AOCS Ce 6-86
Determination of peroxide value: AOCS Cd 8-53
Determination of acidity: AOCS Ca 5a-40

Example 2A

First Frying Test Method

Various frying test methods can be used to evaluate the reduction in oil uptake of oil compositions under embodiments of the present invention. For example, Example 2A, 5A, and 2B. Example 2A describes a "First Frying Test Method" that can be used to determine whether a composition meets the First Frying Test Method in the claimed invention. In the First Frying Test Method: 200 Kg of the oil composition of Example 1A were added to a HEAT AND CONTROLS semi-industrial fryer capable of continuous operation and preheated to 180° C. After the oil composition was heated, an eight-hour baking and deep frying operation was conducted with a constant supply of 170 kg/h laminated corn snacks (also referred to hereinafter as the "first test food product"). The laminated corn snacks were previously selected to guarantee homogeneity.

The baking and deep frying operation parameters were as follows:

TABLE 6A

LAMINATED CORN SNACKS COOKING PARAMETERS

| | |
|---|---|
| Baking temperature step 1(° C.) | 120 |
| Baking temperature step 2 (° C.) | 290 |
| Baking temperature step 3 (° C.) | 455 |
| Humidity (Before frying %) | 33.7 |
| Humidity (After frying %) | 1 |
| Residence time in fryer (s) | 50 |
| Out-of-fryer temperature (° C.) | 152 |

After frying, a sample of the laminated corn snacks was taken from the process line every 30 minutes, and left to rest in a metal tray for 10 minutes. After this time, the laminated corn snacks were stored in bags, macerated, and prepared for drying at 105° C. for 3 hours. After drying, when all the moisture was removed, the sample was subjected to Soxhlet extractions for four hours, using hexane as a solvent. The fat content of the laminated corn snacks samples was then determined using the AOAC 945.16 method.

16 samples were taken during the eight-hour baking and deep frying operation in order to average the results. The same test method of Example 2A was repeated using the oil base alone (vegetable oil blend including palm oil, canola oil, soybean oil, or their fractions) instead of the oil composition of Example 1A.

For Example 2A, when the fat content of the laminated corn snacks fried with the oil composition of Example 1A was compared to the fat content of laminated corn snacks fried in the oil base alone (vegetable oil blend including palm oil, canola oil, soybean oil, or their fractions), a reduction of up to 16.42% in the fat content of the fried laminated corn snacks was observed, indicating a proportional reduction in the absorption of oil into the first test food product when the oil composition of Example 1A was used.

Under embodiments of the present invention, the sensory attributes of the fried first test food product may be evaluated using a sensory evaluation method, such as the International Organization for Standardization's (ISO) Sensory analysis—Triangle test ISO 4120:2004 or the Colombian Institute of Technical Norms and Certifications' (ICONTEC) Sensory analysis—Triangle test NTC-2681. For example, an analysis of the sensory attributes of the laminated corn snacks fried with the oil composition of Example 1A and the oil base alone showed no significant differences between these laminated corn snacks in terms of smell, flavor and residual sensation when evaluated under the NTC-2681 triangle test. The results of the comparison test had a 95% confidence level under the NTC-2681 regulations. Similar results are obtained when the oil composition uses TABACO2 or MYVEROL™ 1835K as the uptake reducer in the oil composition.

Example 3A

In another exemplary embodiment of the invention, an oil composition was prepared following the procedure in Example 1A by mixing 97% by weight of a vegetable oil blend (palm oil, canola oil, soybean oil, or their fractions) with 3% by weight of TABACO1, an uptake reducer, based on the total weight of the oil composition, and 120 ppm TBHQ. The oil composition of Example 3A was then tested in accordance with the First Frying Test Method. When compared to the laminated corn snacks fried in oil base alone (vegetable oil blend including palm oil, canola oil, soybean oil, or their fractions), the laminated corn snacks fried in the oil composition of Example 3A showed a fat content reduction of up to 7.96%.

Example 4A

In another exemplary embodiment of the invention, an oil composition was prepared by mixing 93% by weight of a vegetable oil blend (palm oil, canola oil, soybean oil, or their fractions) with 7% by weight of TABACO2, an uptake reducer, based on the total weight of the oil composition. The vegetable oil blend and the TABACO2 were mixed at a temperature of 68° C., using a Stephan 132M-4-180 colloid mill with two speeds (1698 rpm and 3456 rpm) for 10 minutes with recirculation. Additionally, 120 ppm of TBHQ (tert-Butylhydroquinone) was added as an antioxidant agent and 7 ppm of DMPS (dimethyl polisiloxane) was added as an antifoaming agent.

Tables 7A, 8A, 9A, 10A, and 11A illustrate the physicochemical parameters and lipid composition of the oil composition of Example 4A and its components:

TABLE 7A

OIL COMPOSITION OF EXAMPLE 4A

| | |
|---|---|
| Acidity (% Oleic) | 0.04 |
| Peroxides (mEq $O_2$/Kg. sample) | 0.04 |
| Monoglycerides (%) | <0.1 |
| Diglycerides (%) | 6.6 |
| Triglycerides (%) | 93.3 |
| Composition of fatty acids | % |
| C16:0 | 25.14 |
| C18:0 | 5.68 |
| C18:1 | 40.20 |
| C18:2 | 20.97 |

TABLE 8A

TABACO2

| | |
|---|---|
| Total monoglycerides (%) | <0.1 |
| Total diglycerides (%) | 7.2 |
| Total triglycerides (%) | 92.7 |
| Free glycerol (%) | Max. 1 |
| Acid value (mg KOH/g) | 0.05 |
| Iodine value (g 12/100 g) | Max 5 |
| Saturated fatty acid content (%) | >90 |
| Fusion point (° C.) | 56-60° C. |
| Physical form | Plastic |
| Appearance | White |
| Origin | Vegetable oil |

TABLE 9A

VEGETABLE OIL BLEND COMPOSITION

| | |
|---|---|
| Acidity (% Palmitic) | 0.04 |
| Peroxides (mEq $O_2$/kg sample) | 0.1 |
| Monoglycerides (%) | <0.1 |
| Diglycerides (%) | 6.5 |
| Triglycerides (%) | 93.4 |
| Composition of fatty acids | % |
| C16:0 | 24.58 |
| C18:0 | 4.09 |
| C18:1 | 41.46 |
| C18:2 | 21.64 |

TABLE 10A

TBHQ (tert-Butylhydroquinone)

| | |
|---|---|
| Purity (%) | Min 99 |
| Fusion point (° C.) | 127 |
| Boiling point (° C.) | 295 |
| Flash point (° C.) | 171 |
| Content of hydroquinone (%) | Max. 0.1 |
| Appearance | White powder |

TABLE 11A

| DMPS (Dimethyl Polisiloxane) | |
| --- | --- |
| Specific Gravity at 25° C. (77° F.) | 0.960 |
| Melt Point, ° C. (° F.) | −41 (−42) |
| Appearance | Crystal clear liquid from suspended matter and sediment |
| Surface Tension at 25° C. (77° F.), dynes/cm | 20.8 |
| Color, APHA | 5 |
| Viscosity Temperature Coefficient | 0.59 |

Example 5A

Second Frying Test

Example 5A describes a "Second Frying Test Method" that can be used to determine whether a composition meets the Second Frying Test Method in the claimed invention. In the Second Frying Test Method: 200 Kg of the oil composition of Example 4A were added to a HEAT AND CONTROL® semi-industrial fryer capable of continuous operation and preheated to 180° C. Later, after the oil composition was heated, an eight-hour baking and deep frying operation was conducted with a constant supply of 170 kg/h of laminated corn snacks (also hereinafter referred to as the "second test food product"). The laminated corn snacks were previously selected to guarantee homogeneity.

The baking and deep frying operation parameters were as follows:

TABLE 12A

| LAMINATED CORN SNACKS COOKING PARAMETERS | |
| --- | --- |
| Baking temperature step 1 (° C.) | 131 |
| Baking temperature step 2 (° C.) | 290 |
| Baking temperature step 3 (° C.) | 454 |
| Humidity (Before frying %) | 33.37 |
| Humidity (After frying %) | 0.95 |
| Residence time in fryer (s) | 50 |
| Out-of-fryer temperature (° C.) | 153 |

After frying, a sample of the laminated corn snacks was taken from the process line every 30 minutes, and left to rest in a metal tray for 10 minutes. After this time, the laminated corn snacks were stored in bags, macerated, and prepared for drying at 105° C. for 3 hours. After drying, once all the moisture was removed, the sample was subjected to Soxhlet extractions for four hours, using hexane as a solvent. The fat content of the laminated corn snacks sample was determined using the AOAC 945.16 method.

16 samples were taken during the eight-hour baking and deep frying operation in order to average the results. The same test method of Example 5A was repeated using the oil base alone (vegetable oil blend including palm oil, canola oil, soybean oil, or their fractions) instead of the oil composition of Example 4A.

For Example 5A, when the fat content of the laminated corn snacks fried with the oil composition of Example 4 was compared to the fat content of the laminated corn snacks fried in the oil base alone (vegetable oil blend including palm oil, canola oil, soybean oil, or their fractions), a reduction of up to 12.24% in the fat content of the fried laminated corn snacks was observed, indicating a similar reduction in the absorption of oil into the second test food product when the oil composition of Example 4A was used.

The sensory attributes of the laminated corn snacks fried with the oil composition of Example 4a and in the oil base alone showed no significant difference in terms of smell, flavor and residual sensation when evaluated under the NTC-2681 triangle test. The results of the comparison test had a confidence level of 95% under the NTC-2681 regulations.

Example 6A

In one exemplary embodiment of the invention, an oil composition was prepared by mixing 97% of a vegetable oil blend (including palm oil, canola oil, soybean oil, or their fractions) with 3% by weight of TABACO2, an uptake reducer, based on the total weight of the oil composition, and 120 ppm TBHQ. The oil composition of Example 6A was tested in accordance with the Second Frying Test Method. When compared to the laminated corn snacks fried in oil base alone (vegetable oil blend including palm oil, canola oil, soybean oil, or their fractions), the laminated corn snacks fried in the oil composition of Example 6A showed a fat content reduction of up to 8.46%.

Example 1B in another exemplary embodiment of the present invention, an oil composition was prepared as follows: 98% by weight of a vegetable oil, mostly monounsaturated vegetable oil (palm olein), was mixed with 2% by weight of MYVEROL™ 1835K (provided by Kerry Ingredients), an uptake reducer, based on the total weight of the oil composition. The vegetable oil and the MYVEROL™ 1835K were mixed at a temperature of 65° C. using a Stephan 132M-4/2-180 colloid mill with two speeds (1698 rpm and 3456 rpm) for 10 minutes with recirculation. Additionally, 120 ppm of TBHQ (tert-Butylhydroquinone) was added as an antioxidant agent.

Tables 1B, 2B, 3B, and 4B illustrate the physicochemical parameters and lipid composition of the oil composition of Example 1B and its components.

TABLE 1

| Oil COMPOSITION OF EXAMPLE 1 | |
| --- | --- |
| Acidity (% Palmitic) | 0.065 |
| Peroxides (mEq O$_2$/kg sample) | 1.56 |
| Monoglycerides (%) | 1.86 |
| Diglycerides (%) | 0.14 |
| Triglycerides (%) | 98 |
| Composition of fatty acids | % |
| C16:0 | 35.09 |
| C18:0 | 4.48 |
| C18:1 | 45.90 |
| C18:2 | 11.69 |

TABLE 2

| MYVEROL ® 1835K | |
| --- | --- |
| Total monoglycerides (%) | 93 |
| Free glycerol (%) | Max. 1 |
| Diglycerides (%) | 5 |
| Acid value (mg KOH/g) | Max. 3 |

TABLE 2-continued

MYVEROL ® 1835K

| | |
|---|---|
| Iodine value (g 12/100 g) | 40 |
| Fusion point (° C.) | 55 |
| Physical form | Plastic |
| Appearance | White |
| Origin | Palm |

TABLE 3

PALM OLEIN

| | |
|---|---|
| Acidity (% Palmitic) | 0.013 |
| Peroxides (mEq O$_2$/kg sample) | 0.57 |
| Monoglycerides (%) | 0.3 |
| Diglycerides (%) | 0.7 |
| Triglycerides (%) | 99 |
| Composition of fatty acids | % |
| C16:0 | 34.60 |
| C18:0 | 4.50 |
| C18:1 | 46.31 |
| C18:2 | 11.73 |

TABLE 4

TBHQ (tert-Butylhydroquinone)

| | |
|---|---|
| Purity (%) | Min 99 |
| Fusion point (° C.) | 127 |
| Boiling point (° C.) | 295 |
| Flash point (° C.) | 171 |
| Content of hydroquinone (%) | Max. 0.1 |
| Appearance | White powder |

Example 2B

Third Frying Test Method

Example 2B describes a "Third Frying Test Method" that can be used to determine whether a composition meets the Third Frying Test Method in the claimed invention. In the Third Frying Test Method: 4500 grams of the oil composition of Example 13 were added to an Electric fryer EF-102 and preheated to 176° C. Later, 350 grams of French fry-style potatoes Pommes Frites Lamb Weston®, with dimensions of 9×9 mm, pre-frozen at −10° C., and previously selected to guarantee homogeneity, were weighed and added to the fry basket. The basket was shaken back 4 times in order to remove excess ice crystals and fine potato particles. The potatoes were introduced into the hot oil (at 176° C.). After 30 seconds, the basket was removed and shaken back 3 times (always applying the same force), to separate the potatoes from each other, in order to fry them uniformly. The potatoes were fried for four minutes and thirty seconds. After frying, the potatoes were removed from the oil and drained for 10 seconds by leaving the basket tipped up. The potatoes were then left to rest for 30 seconds in a horizontal position. After this time, the potatoes were arranged and left to cool on a metal tray for 15 minutes. Finally, the potatoes were stored in bags, macerated, and prepared for drying at 105° C. for 3 hours. After drying, when all the moisture was removed, the samples were subjected to Soxhlet extractions for four hours, using hexane as a solvent. The fat content of the fried potatoes was then determined using the AOAC method 945.16.

The testing procedure was repeated 8 times in order to average the results. The same testing procedures were used to evaluate the fat content of the same type of potatoes fried with the oil base alone.

For Example 2B, when the fat content of the potatoes fried with the oil composition of Example 1B was compared to the fat content of potatoes fried in the oil base alone (100% palm olein), an average fat content reduction of 5.84% was observed when the oil composition of Example 1B was used.

An analysis of the sensory attributes of the potatoes fried in the oil composition of Example 1B and in the oil base alone showed no significant differences in terms of smell, flavor and residual sensation when evaluated under the NTC-2681 triangle test. The results of the comparison test had a confidence level of 95% as provided by the NTC-2681 regulations.

Example 3B

In another exemplary embodiment of the invention, an oil composition was prepared following the procedure in Example 1B by mixing 97% palm olein, 3% MYVEROL™ 1835K, an uptake reducer, and 120 ppm TBHQ. The oil composition of Example 3B was tested in accordance with the Third Frying Test Method. When compared to the potatoes fried in the oil base alone (100% palm olein), the potatoes fried in the oil composition of Example 3B showed a 7.48% reduction in the fat content.

Example 4B

In another exemplary embodiment of the invention, an oil composition having 96% oil base was prepared following the procedure in Example 1B by mixing 96% palm olein, 4% MYVEROL™ 1835K, an uptake reducer, and 120 ppm TBHQ. The oil composition of Example 4B was tested in accordance with the Third Frying Test Method. When compared to the potatoes fried in the oil base alone (100% palm olein), the potatoes fried in the oil composition of Example 4B showed a 9.25% reduction in the fat content.

Example 5B

In another exemplary embodiment of the invention, an oil composition having 95% oil base was prepared following the procedure in Example 1B by mixing 95% palm olein, 5% MYVEROL™ 1835K, an uptake reducer, and 120 ppm TBHQ. The oil composition of Example 5B was tested in accordance with the Third Frying Test Method. When compared to the potatoes fried in the oil base alone (100% palm olein), the potatoes fried in the oil composition of Example 5B showed a 10.96% reduction in fat content.

Example 6B

In another exemplary embodiment of the invention, an oil composition having 93% oil base was prepared following the procedure in Example 1B by mixing 93% palm olein, 7% MYVEROL™ 1835K, an uptake reducer, and 120 ppm TBHQ. The oil composition of Example 6B was in accordance with the Third Frying Test Method. When compared to the potatoes fried in the oil base alone (100% palm olein), the potatoes fried in the oil composition of Example 6B showed a 6.63% reduction in the fat content.

Example 7B

In another exemplary embodiment of the invention, an oil composition having 92% oil base was prepared following the procedure in Example 1B by mixing 92% palm olein, 8% MYVEROL™ 1835K, an uptake reducer, and 120 ppm TBHQ. The oil composition of Example 7B was tested in accordance with the Third Frying Test Method. When compared to the potatoes fried in the oil base alone (100% palm olein), the potatoes fried in the oil composition of Example 7B showed a 4.40% reduction in the fat content.

Although a few embodiments of the present invention have been shown and described, it will be appreciated by those skilled in the art that changes may be made in these embodiments without departing from the principles and spirit of the present invention, the scope of which is defined in the appended claims and their equivalents.

The invention claimed is:

1. An oil composition, consisting essentially of:
   at least 90% of an oil base, based on a total weight of the oil composition, consisting of at least one of palm oil, soybean oil, high oleic sunflower oil, canola oil, palm olein, soy oil, rapeseed oil, cotton oil, sunflower oil, and their fractions, and mixtures thereof; and
   1% to 10% of an uptake reducer, based on the total weight of the oil composition, consisting essentially of at least one of monoglycerides, diglycerides, triglycerides, and mixtures thereof,
   wherein the uptake reducer has between 0.1% and 10% diglycerides, based on the total weight of the uptake reducer,
   wherein the uptake reducer has between 5% and 95% triglycerides, based on the total weight of the uptake reducer, and
   an antifoamer;
   wherein a saturated fatty acid content of the oil composition is between 10% and 99%, based on the total weight of the oil composition,
   wherein a trans-fatty acid content of the oil composition is no more than 2%, based on the total weight of the oil composition, and
   wherein, when a first test food product is fried in the oil composition in accordance with a First Frying Test Method, a fat content of the first test food product is at least 2% less than when the first test food product is fried in accordance with the First Frying Test Method using the oil base alone.

2. The oil composition of claim 1, wherein the oil composition consists essentially of at least 94% of the oil base and 1% to 6% of the uptake reducer, based on the total weight of the oil composition, and the uptake reducer has:
   between 10% and 99% saturated fatty acid content, based on a total amount of fatty acids in the uptake reducer, and
   5% and 95% monoglycerides, 1% and 10% diglycerides, and no more than 1% free glycerol, based on the total weight of the uptake reducer.

3. The oil composition of claim 1, wherein the oil composition consists essentially of at least 94% of the oil base and 1% to 6% of the uptake reducer, based on the total weight of the oil composition, and the uptake reducer has:
   75% saturated fatty acid content, based on a total amount of fatty acids in the uptake reducer, and
   45% monoglycerides, 7% diglycerides, 48% triglycerides, and no more than 1% free glycerol, based on the total weight of the uptake reducer, and
   wherein the uptake reducer has:
   an acid value (mg KOH/g) of no more than 2,
   an iodine value (g 12/100 g) of no more than 25, and
   a fusion point of 56° C.

4. The oil composition of claim 1, wherein the oil composition does not separate into a solid and liquid phase when stored at 10° C. above a melting point of the oil composition after 10 days.

5. The oil composition of claim 1, wherein the oil composition has a smoke point between 180° C. and 230° C.

6. The oil composition of claim 1, wherein the oil composition consists essentially of at least 95% of the oil base and 1% to 5% of the uptake reducer, based on the total weight of the oil composition, and the uptake reducer has:
   at least 90% saturated fatty acid content, based on a total amount of fatty acids in the uptake reducer, and
   no more than 1% monoglycerides, between 90% and 95% triglycerides, and no more than 1% free glycerol, based on the total weight of the uptake reducer.

7. The oil composition of claim 1, wherein the oil composition consists essentially of at least 95% of the oil base and 1% to 5% of the uptake reducer, based on the total weight of the oil composition, and the uptake reducer has:
   between 90% and 99% monoglycerides, and no more than 1% free glycerol, based on the total weight of the uptake reducer.

8. The oil composition of claim 1, wherein the oil base comprises a mixture of one or more vegetable oils and monounsaturated vegetable oils.

9. An oil composition, consisting essentially of:
   at least 95% of an oil base, based on a total weight of the oil composition, consisting of at least one of palm oil, soybean oil, high oleic sunflower oil, canola oil, palm olein, soy oil, rapeseed oil, cotton oil, sunflower oil, and their fractions, and mixtures thereof; and
   1% to 5% of an uptake reducer, based on the total weight of the oil composition,
   wherein the uptake reducer has between 0.1% and 10% diglycerides, based on the total weight of the uptake reducer,
   wherein the uptake reducer has between 5% and 95% triglycerides, based on the total weight of the uptake reducer,
   an antifoamer;
   wherein the uptake reducer consists essentially of at least one of monoglycerides, diglycerides, triglycerides, and mixtures thereof;
   wherein a saturated fatty acid content of the oil composition is between 10% and 99%, based on the total weight of the oil composition,
   wherein a trans-fatty acid content of the oil composition is no more than 2%, based on the total weight of the oil composition, and
   wherein, when a second test food product is fried in the oil composition in accordance with the Second Frying Test Method, a fat content of the second test food product is between 2% and 14% less than when the second test food product is fried in accordance with the Second Frying Test Method using the oil base alone.

10. An oil composition, consisting essentially of:
   at least 90% of an oil base, based on a total weight of the oil composition, consisting of at least one of palm oil, soybean oil, high oleic sunflower oil, canola oil, palm olein, soy oil, rapeseed oil, cotton oil, sunflower oil, and their fractions, and mixtures thereof; and
   1% to 10% of an uptake reducer, based on the total weight of the oil composition, consisting essentially of at least one of monoglycerides, diglycerides, triglycerides, and mixtures thereof,
   wherein the uptake reducer has less than 1% monoglycerides, based on the total weight of the uptake reducer, wherein the uptake reducer has from 1% to 10% diglycerides, based on the total weight of the uptake reducer,
wherein the uptake reducer has from 90% to 99% triglycerides, based on the total weight of the uptake reducer, and
an antifoamer;
wherein a saturated fatty acid content of the oil composition is between 10% and 99%, based on the total weight of the oil composition,
wherein a trans-fatty acid content of the oil composition is no more than 2%, based on the total weight of the oil composition, and
wherein, when a first test food product is fried in the oil composition in accordance with a First Frying Test Method, a fat content of the first test food product is at least 2% less than when the first test food product is fried in accordance with the First Frying Test Method using the oil base alone.

\* \* \* \* \*